April 1, 1930.   M. SCHMID   1,753,134

FEED DEVICE FOR THE CARRIAGE OF TYPEWRITING MACHINES

Filed Jan. 15, 1929

Inventor:
Max Schmid

Patented Apr. 1, 1930

1,753,134

UNITED STATES PATENT OFFICE

MAX SCHMID, OF NUREMBERG, GERMANY

FEED DEVICE FOR THE CARRIAGE OF TYPEWRITING MACHINES

Application filed January 15, 1929, Serial No. 332,648, and in Germany April 13, 1928.

This invention relates to an improvement in those type-writing machines in which the platen is moved towards the types arranged on an endless rubber band or the like, in order to obtain the type printing, and it has for its object to effect the feeding of the platen carriage with the aid of simple means without the use of intermediate rods merely by the forward and backward movement of said carriage.

This is obtained by providing perforations in the front and rear longitudinal walls of the carriage with which co-operate wedge-pins mounted on the machine frame and in such a manner that at the forward feeding the carriage is shifted the width of a perforation but at the backward feeding the distance between two perforations.

Figure 1:
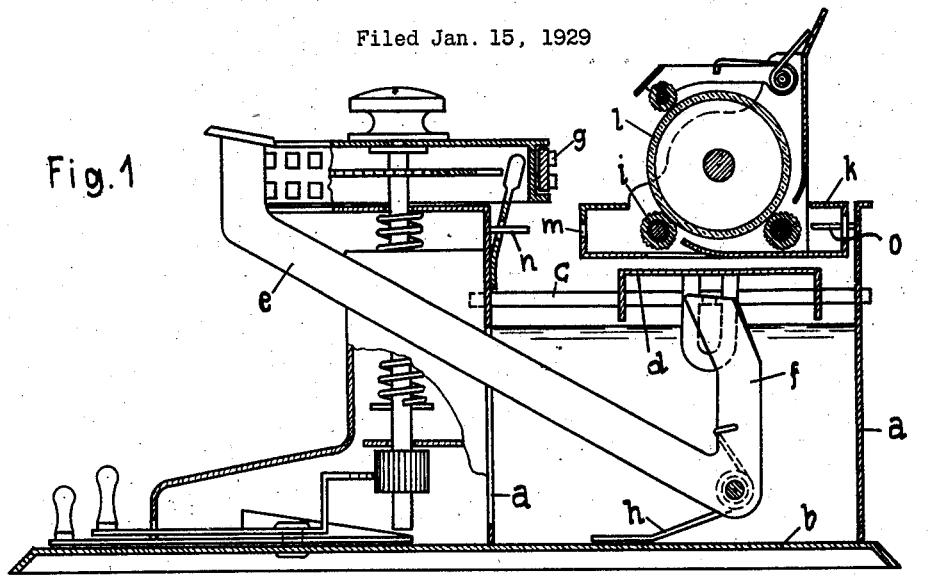
Figure 2:
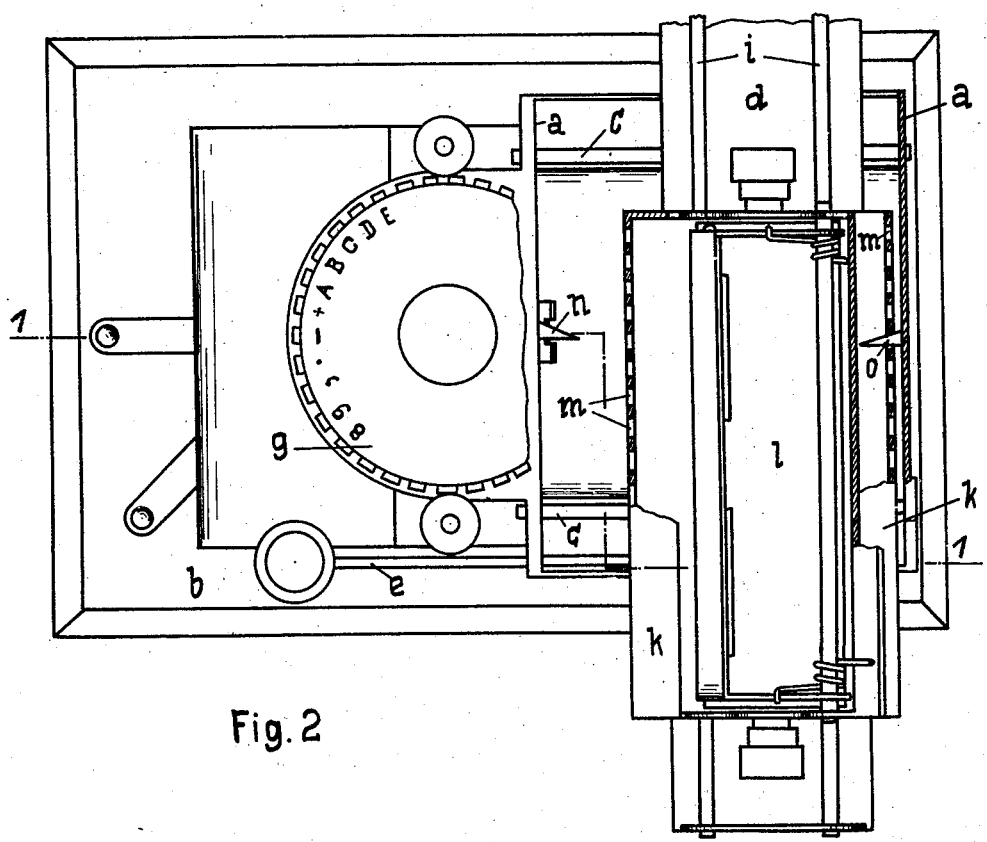

An embodiment of the invention is illustrated by way of example, in the accompanying drawing in which:

Fig. 1 is a vertical cross section on line 1—1 of Fig. 2 and

Fig. 2 a top plan view, partly in section.

In the frame $b$ of the machine having two vertical standards $a$ the carriage $d$ of U-shaped cross section is shiftably guided on horizontal guide rods $c$, said carriage being moved by the key lever $e$, $f$ towards the rotatable guide disc $g$ and automatically moved away from the same by the action of a blade spring $h$.

On the carriage $d$ rest between side walls transverse guides $i$ on which the support $k$ of the platen $l$ is shiftable in lateral direction. The vertical longitudinal walls of the support $k$ have perforations $m$ spaced at regular distances. Opposite these perforations a wedge pin $n$ and a wedge pin $o$ are arranged on the front and back wall or vertical standards $a$, said wedge pins possessing a wedging action of different strength, and they are arranged so that, when the carriage is moved forward towards the type cylinder, said carriage is shifted in lateral direction the width of a perforation, while at the backward movement the rear wedge pin $o$ produces merely a shifting equal to the distance between two perforations so that the next following perforation is ready at the next forward moving of the carriage for receiving the wedge pin $n$.

I claim:—

A feed device for the carriage of typewriting machines in which the platen is moved for printing the types towards the types arranged on an endless rubber band or the like, comprising in combination with the machine frame the type disc and the platen, a paper carriage having perforations in its front and rear longitudinal walls, a front wedge pin, and a rear wedge pin on the machine frame opposite the long sides of the paper carriage co-operating with said perforations in the long side of the carriage in such a manner that at the forward movement said carriage is shifted the width of a perforation and at the backward movement the distance between two adjacent perforations.

In testimony whereof I affix my signature.

MAX SCHMID.